(12) United States Patent
Chesser (10) Patent No.: US 10,094,404 B2
(45) Date of Patent: Oct. 9, 2018

(54) FURNITURE AND OTHER ITEM ASSEMBLY METHOD AND SYSTEM

(71) Applicant: William R. Chesser, Fayetteville, AR (US)

(72) Inventor: William R. Chesser, Fayetteville, AR (US)

(*) Notice: Subject to any disclaimer, the term of this patent is extended or adjusted under 35 U.S.C. 154(b) by 148 days.

(21) Appl. No.: 15/158,175

(22) Filed: May 18, 2016

(65) Prior Publication Data

US 2016/0341230 A1    Nov. 24, 2016

Related U.S. Application Data

(60) Provisional application No. 62/163,945, filed on May 19, 2015.

(51) Int. Cl.
*F16B 5/02* (2006.01)
*F16B 7/06* (2006.01)
(Continued)

(52) U.S. Cl.
CPC .............. *F16B 5/065* (2013.01); *A47B 13/04* (2013.01); *A47B 87/0215* (2013.01); *F16B 5/0275* (2013.01); *F16B 7/06* (2013.01); *F16B 12/14* (2013.01); *A47B 13/088* (2013.01); *A47B 2200/0055* (2013.01); *F16B 19/02* (2013.01); *F16B 33/002* (2013.01);
(Continued)

(58) Field of Classification Search
CPC ... A47B 13/04; A47B 13/088; A47B 87/0215; A47B 87/0223; A47B 87/0246; A47B 2220/0052; A47B 2220/0055; A47B 2220/0058; F16B 5/0088; F16B 5/0275; F16B 5/065; F16B 7/06; F16B 7/18; F16B 7/187; F16B 12/14; F16B 12/18; F16B 12/20; F16B 12/2009; F16B 12/30; F16B 12/32; F16B 19/02; F16B 33/002; F16B 37/041; F16B 2012/103; F16B 2012/106; Y10T 403/29; Y10T 403/299; Y10T 403/33; Y10T 403/335; Y10T 403/75
USPC ......... 403/43, 48, 167, 168, 408.1, DIG. 12, 403/DIG. 13
See application file for complete search history.

(56) References Cited

U.S. PATENT DOCUMENTS 3,589,784 A * 6/1971 Winkels ................. A47B 47/04
312/263
6,017,107 A * 1/2000 Elliott ..................... A47B 47/04
108/181

(Continued)

*Primary Examiner* — Josh Skroupa
(74) *Attorney, Agent, or Firm* — Arent Fox (57) ABSTRACT

A hardware system for assembly to form an item, such as an item of furniture. The system includes a tension adjustment device, such as a turnbuckle, which may be threadably engaged with two rods, inserted into two rod inserts located on each of the turnbuckle's two opposite sides. The rods may pass through a series of alternating base material components and spacers therebewteen to form an item's body, the turnbuckle being located, for example, in or near the middle of the two series. The ends of the rods opposite the turnbuckle may be threaded into inserts fixed in an end piece of base material of their respective series. The turnbuckle may be twisted or otherwise adjusted to secure or compress the system. A final assembly may have one or more such series and may give the illusion of a solid bar of hardware being passed through the base material.

9 Claims, 6 Drawing Sheets

(51) Int. Cl.
*F16B 12/14* (2006.01)
*A47B 13/04* (2006.01)
*A47B 87/02* (2006.01)
*F16B 5/06* (2006.01)
*A47B 13/08* (2006.01)
*F16B 19/02* (2006.01)
*F16B 33/00* (2006.01)
*F16B 37/04* (2006.01)

(52) U.S. Cl.
CPC ......... *F16B 37/041* (2013.01); *Y10T 403/299* (2015.01); *Y10T 403/335* (2015.01); *Y10T 403/75* (2015.01)

(56) References Cited

U.S. PATENT DOCUMENTS

| | | | |
|---|---|---|---|
| 8,464,880 B2* | 6/2013 | Lim | A47B 47/00 |
| | | | 211/195 |
| 8,899,867 B2* | 12/2014 | Tatomir | A42B 3/20 |
| | | | 403/168 |
| 9,210,998 B2* | 12/2015 | Kadosh | A47B 13/088 |
| 9,408,429 B2* | 8/2016 | Tatomir | A42B 3/20 |
| 9,456,697 B2* | 10/2016 | Simitian | A47C 7/16 |

* cited by examiner

FURNITURE AND OTHER ITEM ASSEMBLY METHOD AND SYSTEM

CROSS-REFERENCE TO RELATED APPLICATIONS

This application is a U.S. Patent Application which claims priority to U.S. Provisional Application No. 62/163,945, filed May 19, 2015. The disclosure of the priority application is incorporated in its entirety herein by reference.

SUMMARY OF THE INVENTION

Aspects of the present invention provide hardware systems that may be used to form an assembly, for example, a piece of furniture. Pieces of furniture according to aspects of the present invention may be assembled using multiple base material components compressibly fixed together using other components of the system.

In one example, the base material components may be generally rectangularly cross-sectionally shaped, for example, and aligned in a parallel series such that when the components are compressibly held together, the edges of the rectangular components form a surface, for example, a table surface. Portions of the sides opposite the surface side may form "legs" of the table and aligned openings, for example, in the components may form, for example, a shelf within the table. It is within the scope hereof that various shapes and sizes of base material components may be used in order to form different shaped and sized assemblies usable for various purposes.

According to some aspects of the present invention, the base material components may be compressibly held together using other components of the system such that it appears from external observation that a solid rod passes through the base material components.

Aspects of the present invention provide one or more hardware systems and methods of making and assembling the same. The hardware systems provided in accordance with aspects of the present invention may allow the assembly of multiple components (e.g., via compression to each other) in order to produce assemblies which may be used in various items, such as furniture products. The assemblies may comprise two or more base material components (e.g., furniture components)fixedly positioned relative to one another with one or more of a tension adjustment device, spacer, rod, and insert, for example. The assemblies may be varied by, for example, varying the number, length, and/or shape of the spacers, tension adjustment devices, rods, inserts, and/or base material components. In some embodiments, assemblies may be assembled such that it may not be obvious from external observation how the assembly has been assembled.

Additional advantages and novel features relating to aspects of the present invention will be set forth in part in the description that follows, and in part will become more apparent to those skilled in the art upon examination of the following or upon learning by practice thereof.

DETAILED DESCRIPTION

Aspects of the present invention provide hardware systems that may be used to form an assembly, for example, a piece of furniture. Pieces of furniture according to aspects of the present invention may be assembled using multiple base material components compressibly fixed together using other components of the system.

Figure 1A:
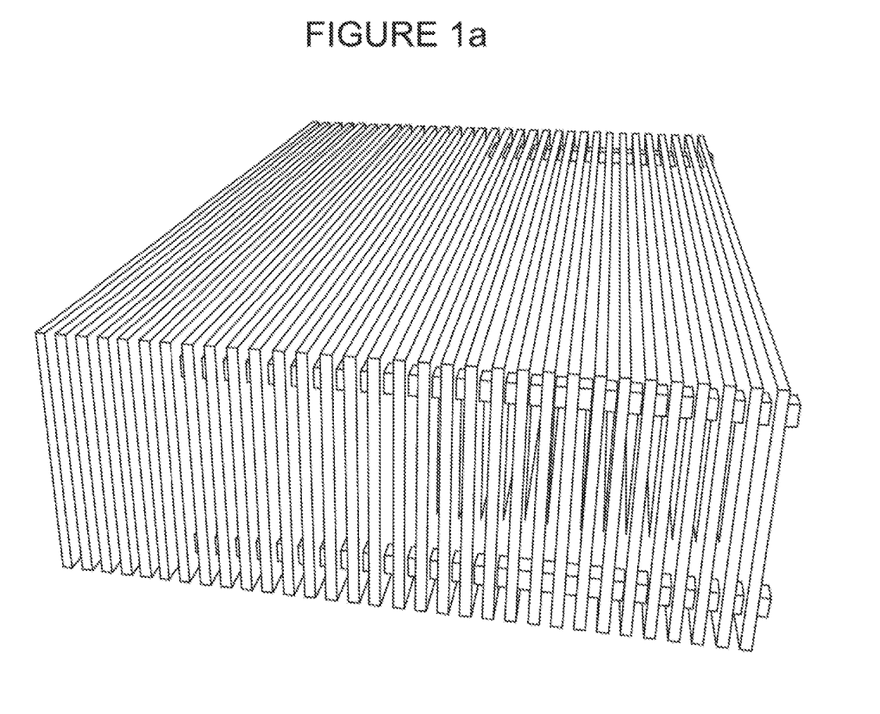
FIG. 1a shows an example assembly according to embodiments of the present invention.

As shown in FIG. 1a, in one example implementation in accordance with aspects of the present invention, the base material components may be generally rectangularly cross-sectionally shaped, for example, and aligned in a parallel series such that when the components are compressibly held together, the edges of the rectangular components form a surface, for example, a table surface. Portions of the sides opposite the surface side may form "legs" of the table and aligned openings, for example, in the components may form, for example, a shelf within the table. It is within the scope hereof that various shapes and sizes of base material components may be used in order to form different shaped and sized assemblies usable for various purposes.

According to some aspects of the present invention, the base material components may be compressibly held together using other components of the system such that it appears from external observation that a solid rod passes through the base material components.

Aspects of the present invention provide one or more hardware systems and methods of making and assembling the same. The hardware systems provided in accordance with aspects of the present invention may allow the assembly of multiple components (e.g., via compression to each other) in order to produce assemblies which may be used in various items, such as furniture products. The assemblies may comprise two or more base material components (e.g., furniture components) fixedly positioned relative to one another with one or more of a tension adjustment device, spacer, rod, and insert, for example. The assemblies may be varied by, for example, varying the number, length, and/or shape of the spacers, tension adjustment devices, rods, inserts, and/or base material components. In some embodiments, assemblies may be assembled such that it may not be obvious from external observation how the assembly has been assembled.

Figure 1B:
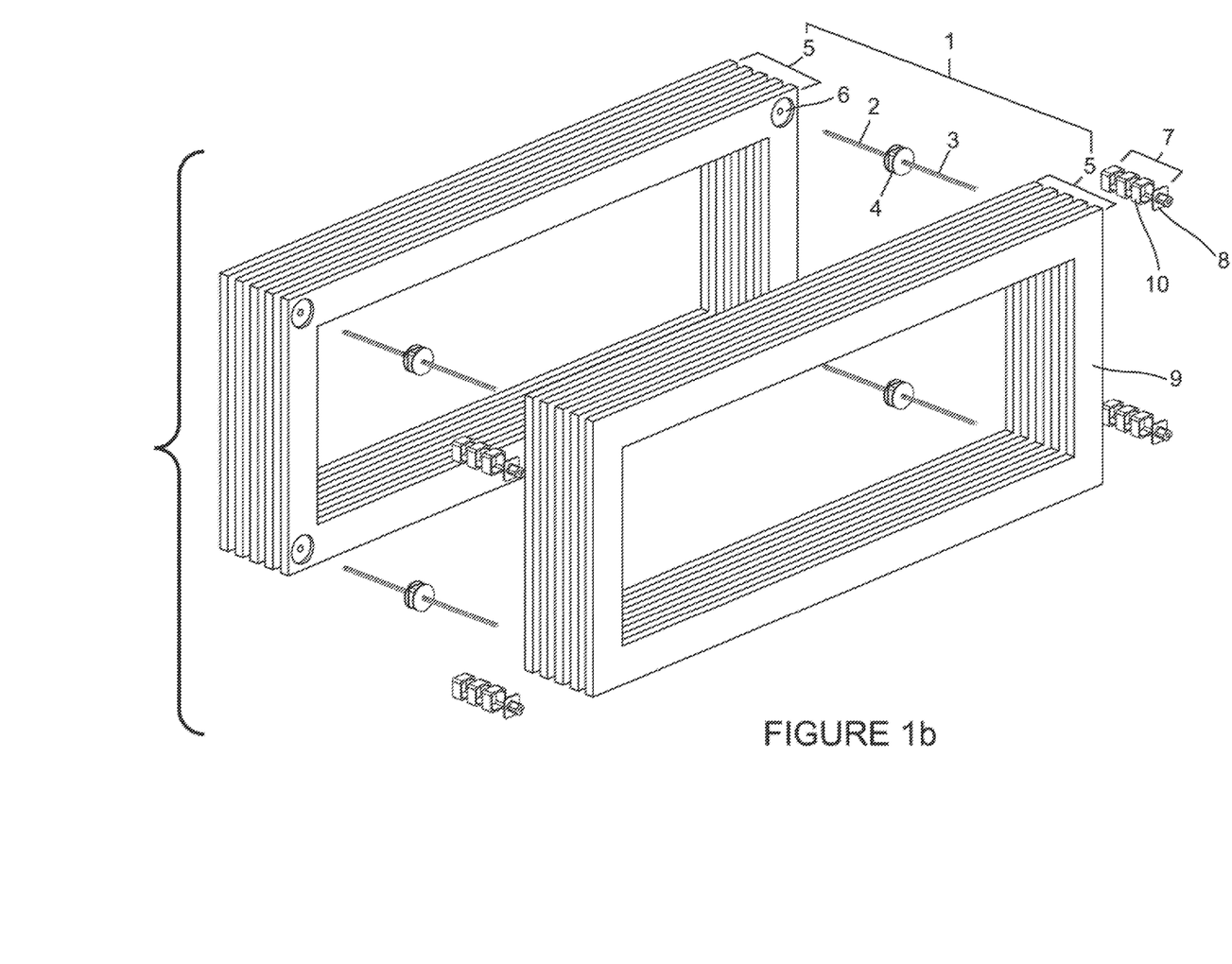
FIG. 1b shows an example assembly according to embodiments of the present invention.

As shown in FIG. 1b, in one example implementation in accordance with aspects of the present invention, an assembly (1) may be assembled by threading a rod (2, 3) into each side of a tension adjustment device. In some embodiments, the tension adjustment device may comprise a turnbuckle (4). Each rod (2, 3) may then be passed through alternating base material components (5) through a hole (6) therein and spacers (7). The end of each rod opposite the turnbuckle may then be threaded into an insert (8), which may be inset into the outermost piece of base material (9). The insert may be hidden by its neighboring spacer (10), for example. The turnbuckle may then be twisted or repositioned relative to the system or otherwise adjusted to secure the system. A final assembly may have one or more such series and may provide the illusion of a solid, continuous bar of hardware being passed through the base material, instead of alternating spacers and base material components.

In some embodiments, such an assembly may comprise one or more rods configured such that the overall assembly provides the illusion or appearance that a solid, continuous bar passes through the base material components. In some embodiments, an assembly may provide the illusion of one, two, three, four, or more bars passing through the base material components. In some embodiments, one or more of the mechanisms by which an assembly is fastened together may not be apparent to the casual observer.

Figure 2:
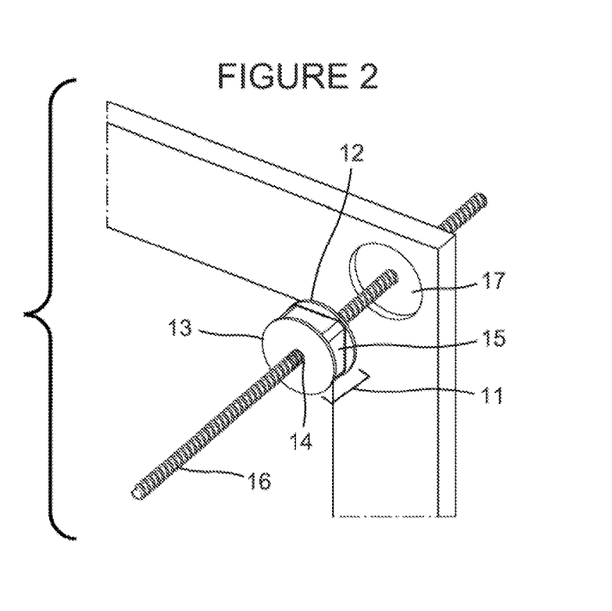
FIG. 2 shows aspects of an example tension adjustment device.

As shown in FIG. 2, in some embodiments, the tension adjustment device (11) may comprise, for example, two base material interfaces (12, 13), two openings (hereinafter referred to as "rod inserts") proximal to the base material interfaces (14), and a center portion arranged between the two base material interfaces (15).

In some embodiments, the rod insert may be configured to receive a rod (16). For example, a rod (16) may have a thread on its outer surface that is receivably engageable with a corresponding thread on the inner surface of the rod insert (14). In some embodiments, each tension adjustment device (11) may comprise one rod insert configured to be threaded right-handed and one that may be threaded left-handed. The term "threaded" refers to the use of a thread, which is a helical structure that may convert between rotational and linear movement or force. The term "right-handed" threading refers to the use of a thread which follows the right hand grip rule, whereas "left-handed" threading refers to the use of a thread which follows the left hand grip rule.

In some embodiments, the base material interfaces (12, 13) may be configured to be receivable into a corresponding recess (17) in a piece of the base material. For example, a base material interface (12) may be receivable within a complementary recess (17) in a piece of the base material that is designed for such purpose. This configuration may be such that the appearance of the base material interface is reduced or eliminated in an assembly.

In some embodiments, the center portion of the tension adjustment device may be configured to appear similar to a spacer. For example, the center portion may be configured to duplicate a spacer such that a tension adjustment device and one or more spacers may be arranged together in an assembly to give the illusion of a solid, continuous bar being passed through the base material components. In some embodiments, the tension adjustment device may be shaped in order to give the illusion of a particularly shaped bar. For example, the tension adjustment device may have a circular, elliptical, square, or rectangular cross-sectional shape, and/or any other suitably desirable shape.

Figure 3:
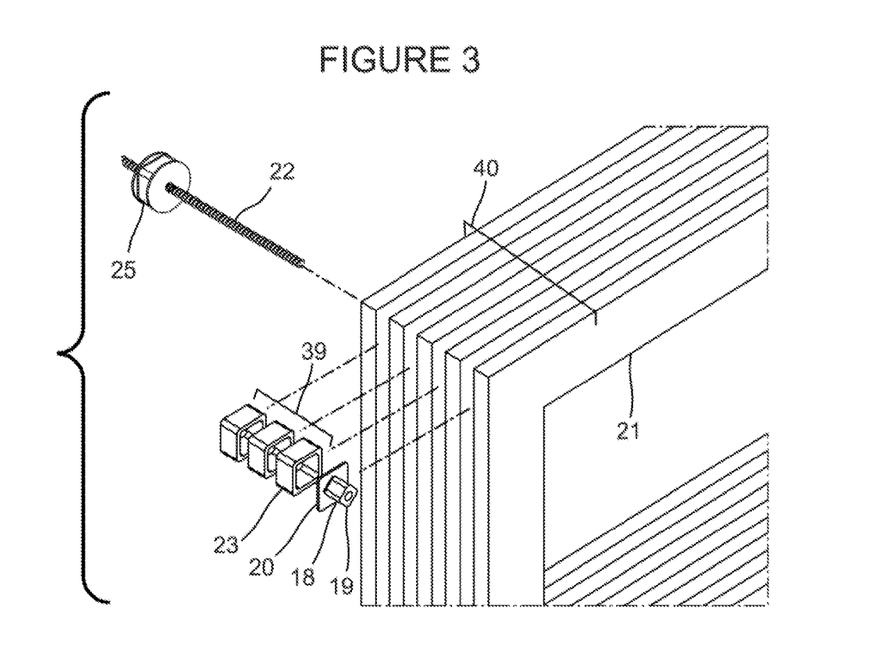
FIG. 3 shows aspects of an example insert in use in an assembly according to certain embodiments of the present invention.

As shown in FIG. 3, in some embodiments, the insert (18) may comprise a base (19) and a head (20). In some embodiments, the insert (18) may be configured to interface (e.g., threadably engage) with a piece of the base material (21), a rod (22), and a spacer (23). The insert (18) may be configured such that it may receive a rod (22). For example, the insert may be configured such that it may receive one end (24) of a rod (22) for which an opposite end is received by a tension adjustment device (25). For example, the insert (18) may be configured to receive a rod which has been right-handed and/or left-handed threaded. In some embodiments, the insert head (20) may have the same or a similar radius or equivalent thereof as a spacer (23).

In some embodiments, the insert head (20) may be configured such that it interfaces directly with an outermost spacer (23) located, for example, on one end of a hardware series for which the opposite end may be proximal to a tension adjustment device (25). In some embodiments, the direct interface between the insert and the outermost spacer may absorb the pressure from a tension adjustment device system, such that tension loads created by the system are not passed on to the outermost piece of base material, which may comprise an outermost face of such an assembly.

In some embodiments, the rod (22) may be a threaded rod. In some embodiments, the rod may be right-handed threaded and/or left-handed threaded. The rod may be used to connect the tension adjustment device (25) to the insert (18) and act as the tensioning portion of the system in an assembly.

In some embodiments, the rod may pass through openings in one or more pieces of the base material (40) in an assembly. In some embodiments, the rod may pass through the spacers (39) via openings in such spacers. For example, in some embodiments, one end of the rod (22) may be threaded into the tension adjustment device (25), it may pass through alternating base material components (40) and spacers (39), and the opposite end may be threaded into an insert (19), thereby at least partially holding an assembly together. In some embodiments, the openings in the base material components may be configured such that they may be concealed by a spacer (39) proximal to the piece of base material and thereby hidden from view in an assembly. In some embodiments, the rod (22) may be hidden from view in an assembly by other components of the system.

In some embodiments, one right-handed threaded rod may be threaded into one rod insert on one side of a tension adjustment device (25) and one left-handed threaded rod may be threaded into a second rod insert on the opposite side of the same tension adjustment device (25). The ends of the right-handed threaded rod and the left-handed threaded rod opposite the tension adjustment device may then be threaded into either a right-handed threaded insert or a left-handed threaded insert (18) as is appropriate. In some examples, such a configuration may at least partially allow both easing in applying tension adjustment to the device (25) and the insert to take up slack in the system (18). For example, if the tension adjustment device (25) has one left-handed thread receiving opening and one right-handed thread receiving opening for threadably engaging to corresponding rods having corresponding left-handed and right-handed threads, rotation of the tension adjustment device will contemporaneously draw both rods in directions toward the tension adjustment device (25), so as to draw the inserts (18) toward one another, and thus compressably draw toward and secure the base material components relative to one another. In some embodiments, an assembly may comprise one, two, three, four, or more rods.

Figure 4:
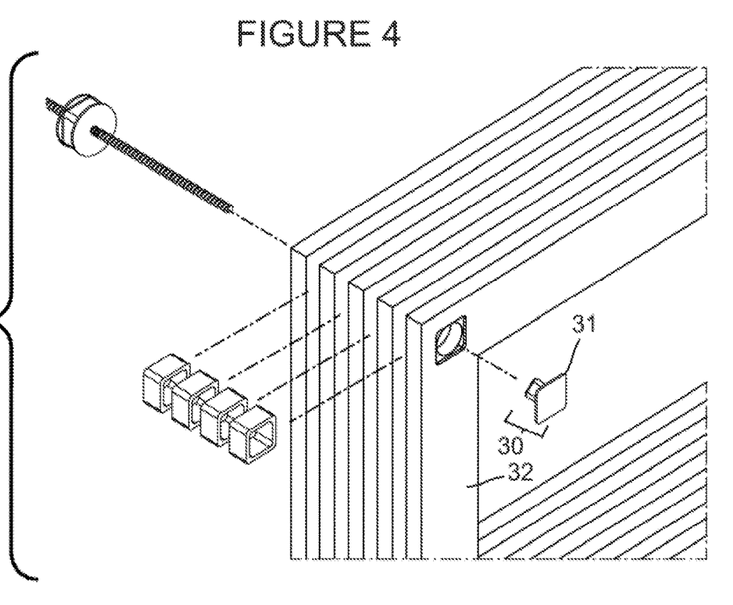
FIG. 4 shows aspects of an example insert for in use in an assembly in accordance with embodiments of the present invention.

As shown in FIG. 4, in some embodiments, the insert (30) may be arranged in an assembly such that the insert head (31) is located on the outside of an outermost piece of base material (32). For example, the insert may be arranged such that it appears as if a solid, continuous hardware bar is passing all the way through the base material pieces. In some embodiments, the thickness of the insert head may be varied such that an illusion of different lengths of hardware material may be created. For example, the thickness of the insert head (31) may be varied from flush with the surface of a piece of base material to protruding beyond the surface of a piece of base material. In some example embodiments, the tensional forces of the tension adjustment device system may be passed through an outermost piece of base material without compromising structural integrity of the system. In this example embodiment, the insert head may or may not be bored (see further description of boring and/or threading the head below).

Figure 5:
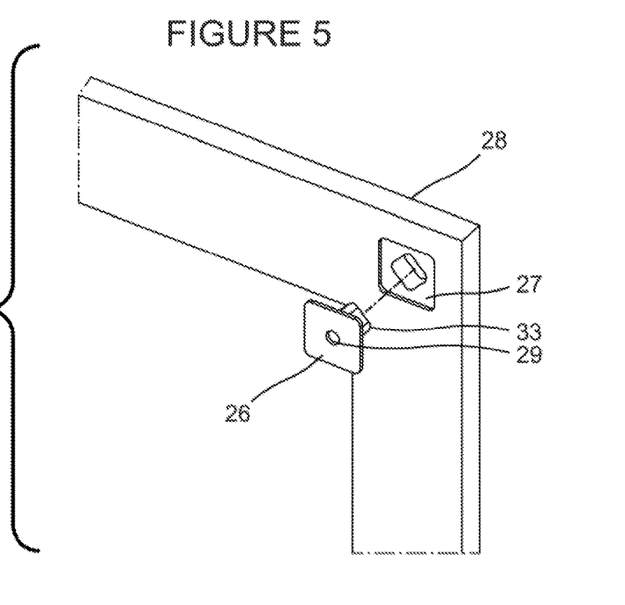
FIG. 5 shows various features of an insert in accordance with aspects of the present invention.

As shown in FIG. 5, the head (26) may be configured to be receivable in a corresponding recess (27) in a piece of the base material (28), for example, the outermost piece of base material. For example, the head (26) may be configured such that it fits snugly within a corresponding recess (27) in the outermost piece of base material, such that it is not visible in an assembly. In some embodiments, the insert head (26) may be bored with an opening (29) such that a rod may be received and threaded into the insert base.

In some embodiments, the insert may be configured to provide a mechanism for attaching it to a piece of the base material. For example, the insert head may be optionally drilled and countersunk in order to add a fastener for attaching the insert to a piece of the base material. Examples of fasteners include, but are not limited to, clamps, clasps, clips, clutches, grommets, nails, pegs, staples, straps, tacks, zippers, buckles, flanges, pins, retaining rings, snaps, bands, stitches, toggles, screw anchors, etc. In some embodiments, adhesive materials may be used to attach the insert to a piece of the base material in addition to or instead of such fasteners. In some embodiments, the optional fasteners and/or adhesive materials may be hidden by a spacer in an assembly.

In some embodiments, the insert base (33) may be configured to be inset into an outermost piece of the base material (28). In some embodiments, the insert base may be configured to receive a rod. For example, the insert base may be configured such that a rod may be threadably received within a corresponding opening in the insert.

Figure 6:
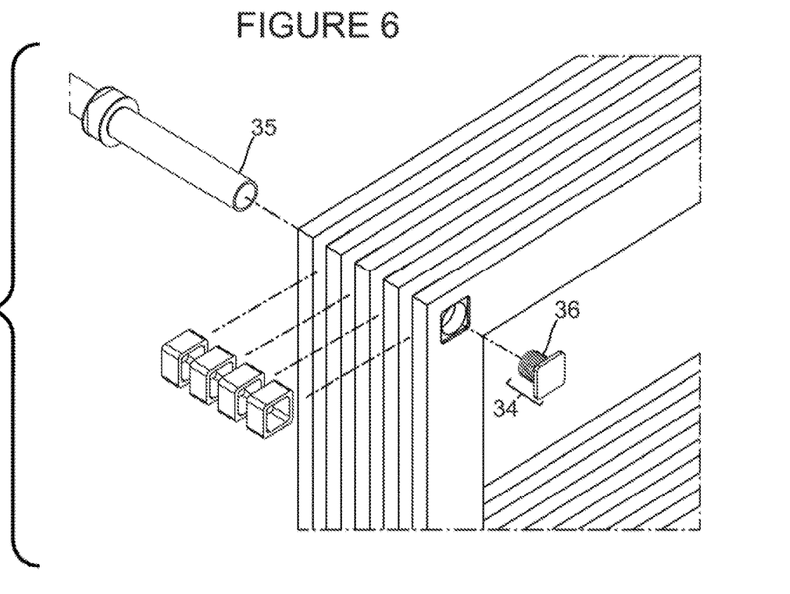
FIG. 6 shows various features of an example hardware system in accordance with embodiments of the present invention.

As shown in FIG. 6, in some embodiments, the insert (34) may be configured such that it may receive a pipe (35) instead of a rod. For example, the insert base (36) may be configured to have a male portion that may be received within a corresponding female portion of a pipe (35), which has replaced a rod in order to at least partially hold an assembly together. For example, such male portion may be received within the female portion by interference fit.

Figure 7:
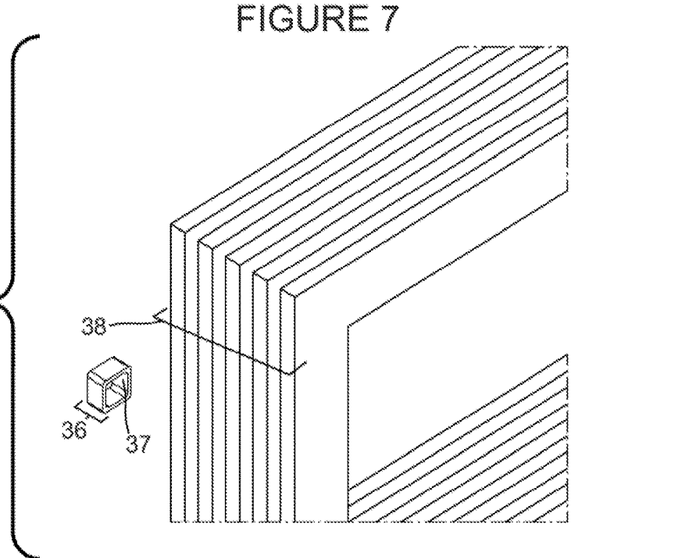
FIG. 7 shows various features of an example spacer in accordance with embodiments of the present invention.

As shown in FIG. 7, in some embodiments, the spacer (36) may comprise two hollow ends or openings (37) forming a passage through which a rod may pass. In some embodiments, the one or more spacers are arranged between pieces of the base material (38) in an assembly. In some embodiments, the one or more spacers may be arranged in an assembly such that the openings (37) face a piece of the base material on either side of the spacer (36).

Turning back to FIG. 3, the spacers (39) may hide the rod (22) from view within the assembly. In some embodiments, the rod (22) may at least partially hold an assembly together, and the spacers (39) may be configured to mask the actual mechanism by which an assembly has been assembled, instead providing an illusion of a continuous, solid bar being passed through the base material components.

In some embodiments, the spacers (39) may be shaped similarly to the center portion of the tension adjustment device (25), such that the assembly provides an illusion of a continuous, solid bar being passed through the base material components. In some embodiments, the spacers (39) may have variable shapes in order to give the illusion of a particularly shaped bar. For example, the spacers (39) may have circular, elliptical, square, or rectangular cross-sections, and/or any other suitably desirable shape. In some embodiments, the length of the one or more spacers (39) may be varied in order to vary the distance between pieces of the base material and/or overall size of an assembly.

In some embodiments, the spacers (39) may be arranged in a series, such that they alternate with pieces of the base material (40). In some embodiments, the spacers may be arranged in a series such that the spacers are aligned and the series gives the illusion of a continuous, solid bar being passed through the base material components (40) rather than merely providing individual spacers alternating with the pieces.

Figure 8:
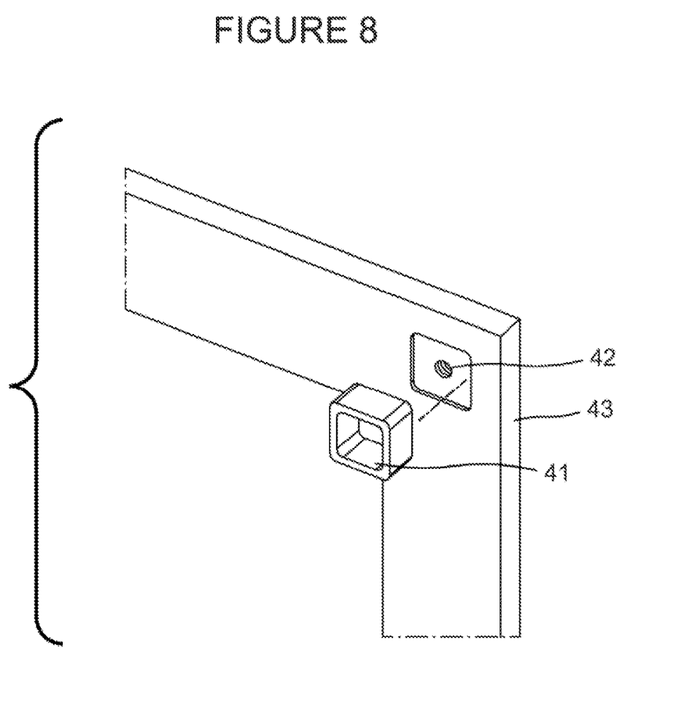
FIG. 8 shows views of an example spacer and corresponding blind holes in a piece of base material, in accordance with aspects of the present invention.

As shown in FIG. 8, in some embodiments, the spacers (41) may be configured to be receivable in a corresponding blind hole or opening (42) cut in a piece of the base material (43), such that the spacer is inhibited from rotation. In some embodiments, such use of the blind hole (42) may give the illusion of a continuous, solid bar being passed through the base material components, rather than alternating spacers and base material components making up the assembly. In some embodiments, the one or more blind holes (42) configured to receive the spacers may be slightly rotated in sequence so as to provide an illusion that the perceived continuous, solid bar is twisting as it passes through the base material components.

In some embodiments, the radius of all of the spacers in a series may be the same or similar. In some embodiments, the radius of all the spacers in a series may be the same as or similar to that of the head of an insert.

In some embodiments, the base material may be any type of material suitably useful for furniture. For example, the base material may be laminar. In some embodiments, the base material components may be configured in any suitable shape that may be desired for furniture. For example, the base material components may have rectangular, square, circular, elliptical, or any other suitable and desirable cross-sectional shape. In some embodiments, the shape and size of the base material components may be varied in order to vary the shape and size of an assembly. In some embodiments, an assembly may comprise one or more different types of base material.

In some embodiments, one or more of the base material components may have a recess configured therein to receive a tension adjustment device. In some embodiments, the recess may be cut in the base material such that a tension adjustment device may turn freely to draw together and/or compressibly lock an assembly together. In some embodiments, the recesses may be configured to encompass the base material interface of a tension adjustment device. For example, each such recess may conceal the base material interface of a tension adjustment device such that only the center portion of a tension adjustment device, for example, is visible in the assembly. For example, the recess may be configured such that it at least partially conceals the fact that the tension adjustment device is slightly different from the other spacers, thereby at least partially contributing to the illusion of a solid, continuous bar of hardware passing through the base material components.

In some embodiments, the base material components may comprise a hole or opening configured to receive a rod. For example, the base material components may comprise holes through which a rod may be inserted in order to at least partially hold an assembly together. In some embodiments, the holes may be configured such that they are hidden from view by the spacers in an assembly. In some embodiments, the holes in two or more base material components may be aligned such that an assembly gives the illusion of a solid, continuous bar being passed through the base material components.

In some embodiments, assemblies may be assembled such that it may not be obvious to the casual observer how the assembly has been assembled. For example, components of the assembly may be arranged to give the illusion of a solid, continuous bar of hardware being passed through the base material. In some embodiments, the tension adjustment device and spacers are configured such that they may be assembled to assist in creating such an illusion.

While aspects of this invention have been described in conjunction with the example features outlined above, various alternatives, modifications, variations, improvements, and/or substantial equivalents, whether known or that are or may be presently unforeseen, may become apparent to those having at least ordinary skill in the art. Accordingly, the example aspects of the invention, as set forth above, are intended to be illustrative, not limiting. Various changes may be made without departing from the spirit and scope hereof. Therefore, aspects of the invention are intended to embrace all known or later-developed alternatives, modifications, variations, improvements, and/or substantial equivalents.

What is claimed:

1. A hardware system for assembling an item, the system comprising:
   a tension adjustment device;
   a first rod engageable with the tension adjustment device at a first end of the first rod;
   a second rod engageable with the tension adjustment device at a first end of the second rod;
   a plurality of base material components, each of the components having at least one opening for receiving the first rod or the second rod;
   a plurality of spacers, each spacer having two open ends forming a passage for receiving the first rod or the second rod, and each of the spacers being located between two of the plurality of base material components; and
   at least two inserts, each insert being threadably engageable with a second end of the first rod, the second end being opposite the first end, or with a second end of the second rod, the second end being opposite the first end,
   wherein the tension adjustment device comprises a first base material interface at a first end and a second base material interface at a second end, and
   wherein the base material components adjacent the tension adjustment device each comprise a recess configured to receive the tension adjustment device such that each recess conceals a respective one of the first and second base material interfaces.

2. The system of claim 1, wherein the plurality of spacers are aligned along a path defined by the first rod and/or the second rod.

3. The system of claim 1, wherein the tension adjustment device comprises at least one rod insert being located proximal to each base material interface and a center portion arranged between the first and second base material interfaces.

4. The system of claim 1, wherein the tension adjustment device comprises a turnbuckle.

5. The system of claim 1, wherein each insert comprises a base portion and a head portion.

6. The system of claim 1, wherein each insert comprises a head; and
   wherein the plurality of base material components include at least one component located proximal to the insert and having a recess to receive the head of the insert.

7. The system of claim 6, wherein the recess is sized and shaped such that the received head of the insert is not visible.

8. The system of claim 1, wherein each of the plurality of spacers is configured to be received in a corresponding opening in one of the plurality of base material components, such that the spacer is prevented from rotating.

9. The system of claim 1, wherein the first rod and the second rod are threadably engageable with the tension adjustment device.

* * * * *